Dec. 1, 1953  R. C. CALLAN  2,661,406
ALTERNATING LIGHT FLASHER FOR BICYCLES
Filed March 1, 1951
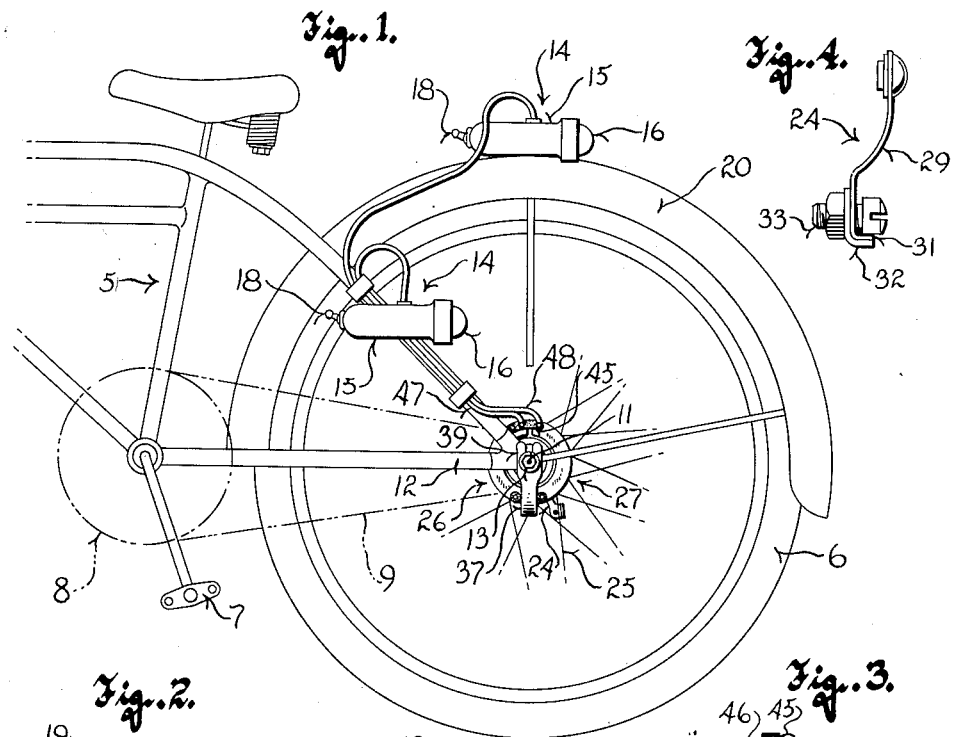
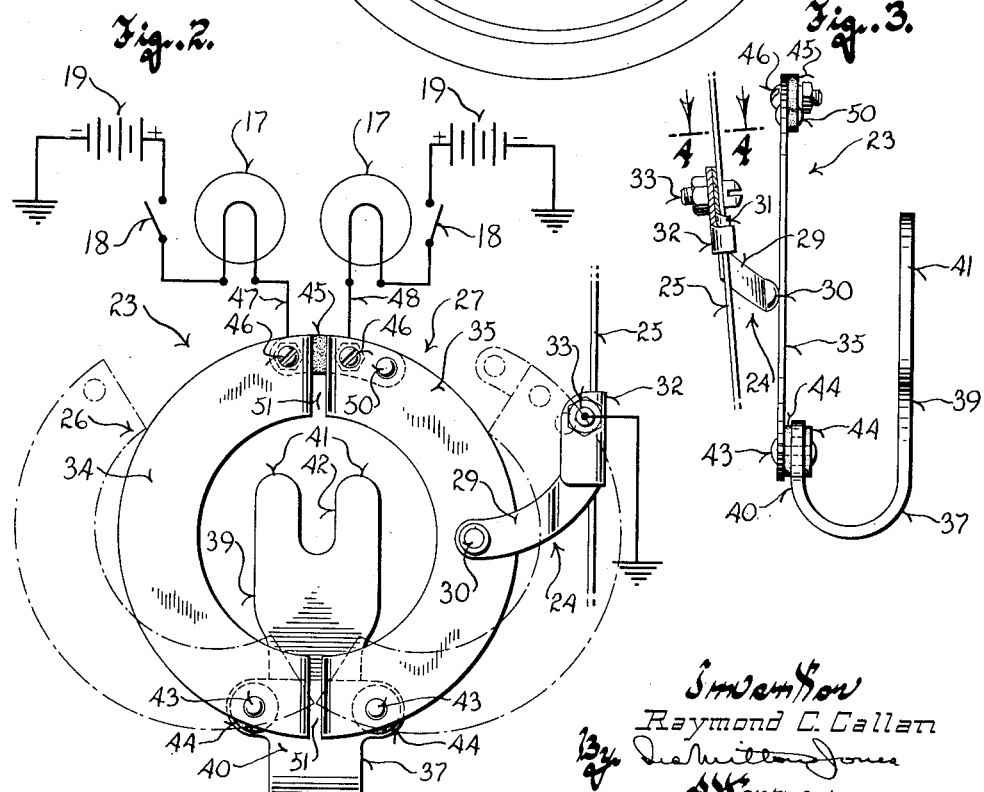
Inventor
Raymond C. Callan Patented Dec. 1, 1953

2,661,406

UNITED STATES PATENT OFFICE 2,661,406

ALTERNATING LIGHT FLASHER FOR BICYCLES

Raymond C. Callan, Milwaukee, Wis., assignor to McLaughlin & Slugg, Milwaukee, Wis., a partnership Application March 1, 1951, Serial No. 213,422

2 Claims. (Cl. 200—61.12)

This invention relates to lighting equipment for bicycles and similar wheeled vehicles, and refers more particularly to improvements in flashing lighting equipment for such vehicles.

Devices for flashing the lights of bicycles and the like, and particularly the tail light of such vehicles, are well known, one example of such a device being shown in the patent to Raymond C. Callan, No. 2,301,250, issued November 10, 1942. Such flasher devices ordinarily comprise an interrupting switch which alternately opens and closes the light circuit in consequence to rotation of a revolving part on the bicycle (such as a wheel or sprocket), the light circuit usually being energized during half of each revolution of the part and "dead" during the remaining half revolution.

While such flashers have the advantage of attracting attention to the bicycle while it is in motion, because of the well known fact that a flashing light is more arresting than a steady one, they have a serious disadvantage in that they leave the vehicle unilluminated if the bicyclist momentarily stops his wheel with the flasher mechanism in its "dead" position.

It is therefore an object of this invention to provide lighting equipment for bicycles and similar wheeled vehicles whereby the lights of such vehicles may be made to flash in consequence to rotation of a revolving part on the vehicle, but which equipment nevertheless provides for complete illumination of the vehicle when the same is stopped.

Another very important object of this invention resides in the provision of a simple and inexpensive flasher switch particularly adapted for alternately and recurrently lighting a pair of lights on a bicycle or similar wheeled vehicle in consequence to rotation of a revolving part on the vehicle.

Still another object of this invention resides in the provision of a switch for flashing a pair of bicycle lights in the manner described, which switch will be extremely inexpensive and easy to install on a vehicle.

It is a further object of this invention to provide a flasher switch of the character described which will be unusually durable and trouble free because of the fact that its movable switch element has self-cleaning wiping engagement with the stationary switch elements, and in which the movable switch element at all times rides in the same plane, there being no cams in the mechanism, so that the switch will require very little energy for its operation.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a side elevational view of the rear portion of a bicycle having the lighting equipment of this invention installed thereon;

Figure 2 is a more or less diagrammatic view of the flasher mechanism of this invention, showing the electrical circuit therefor;

Figure 3 is an end view of the flasher switch mechanism of this invention; and

Figure 4 is a sectional view taken on the plane of the line 4—4 in Figure 3.

Referring now more particularly to the accompanying drawing, in which like numerals designate like parts throughout the several views, the numeral 5 designates the frame of a bicycle or similar wheeled vehicle having a rear wheel 6 driven in the usual manner by means of pedals 7, a sprocket wheel 8 and a sprocket chain 9 trained over the sprocket wheel and the customary sprocket on the rear wheel. The wheel is journaled on an axle 11 received in notches in the fork 12 of the frame, and the end portions of the axle are threaded to receive nuts 13 which clamp against the outer surfaces of the fork to thus retain the axle in the fork.

The lighting attachment of this invention consists of a pair of tail lights designated generally by the numeral 14. Each tail light 14 is of conventional design and comprises a case 15 having a lens 16 at one end. The case 15 houses the usual lamp 17, off-on switch 18, and the usual battery 19. If desired the battery may be housed in a separate case, carried on one of the frame members, or a small generator may be used instead of batteries as a source of electrical energy.

The tail lights may be mounted upon the bicycle in suitable locations, and it has been found that attention is attracted more readily when the tail lights are spaced a substantial distance from one another. A logical arrangement of the tail lights as shown places one of them upon the fork 12 of the frame at one side of the rear wheel and the other upon the rear fender 20 over the rear wheel.

The flasher switch of this invention, designated generally by the numeral 23, alternately completes and breaks a circuit to each of the two lights. The flasher switch comprises, in general, a movable switch element 24 which is clamped onto one of the spokes 25 of the rear wheel (and thus grounded to the bicycle) and a pair of semi-circular stationary switch elements 26 and 27, across which the movable switch element is recurrently and successively moved with a wiping action. Each stationary switch element is connected with one side of the energizing circuit for one of the lights but insulated from the frame and from one another. Hence, as the movable switch element or contactor 24 travels around the stationary switch elements the light circuits are alternately closed.

The movable switch element comprises a curved contactor arm 29 which is cut or stamped from relatively thin resilient sheet metal, such as Phosphor bronze, spring brass or the like. A brass rivet 30 is secured near the lower end of the arm to provide the contact point which rides upon the surfaces of the stationary switch elements, and one of the marginal side edges of the upper portion of the arm is bent at right angles to provide a longitudinal flange 31 which cooperates in securing the arm against displacement with respect to the spoke on which it is clamped.

A clamp member 32, which in effect comprises a reinforcement for the upper part of the contactor arm, is formed from somewhat heavier metal than the arm and has an outline corresponding to that of the upper portion of the contactor arm, as well as a flange along one of its sides which corresponds to the flange on the arm. A hole in the upper portion of the arm is aligned with a tapped hole in the clamp member to receive a bolt 33, and the holes in these parts are so disposed with respect to their flanges that the shank of the bolt is spaced from the flanges a distance substantially equal to the diameter of a bicycle spoke. The head of the single bolt 33 is thus adequate to securely clamp the spoke into the corner formed by the flange and the inner surface of the arm, making a good mechanical and electrical connection between the spoke and the arm. It will be noted that the upper portion of the arm is held snugly between the spoke and the clamp member, somewhat like a lining for the clamp member, by this clamping engagement.

The medial portion of the arm is bent slightly to one side, out of the plane of the upper portion thereof, so as to hold the contactor at the lower end of the arm biased into firm wiping engagement with the surface of the stationary switch elements, which are mounted at one side of the wheel between the wheel and the fork member.

The stationary switch elements or contacts comprise a pair of identical flat half-rings 34 and 35, stamped or otherwise formed from relatively non-resilient sheet metal and secured to a U-shaped bracket 37 which mounts them rigidly in coaxial relation to the axle of the wheel on which the movable contactor is carried and so disposed with respect to one another as to define a flat-faced ring split across its vertical diameter.

The U-shaped bracket 37, which may also be stamped from sheet metal, comprises two legs 39 and 40, the leg 39 being flat and bifurcated to provide a pair of flat, parallel prongs 41 separated by a slot 42, the width of the slot being at least equal to the diameter of the axle to enable the prongs to straddle the axle and to be clamped between the outer side of the fork and the nut which retains the axle in place thereon. The other leg 40 of the U-shaped bracket is substantially shorter than the leg 39, and each of the stationary switch elements or contacts has one end thereof secured to the free end of the leg 40 by means of a rivet 43. The stationary contacts, however, are suitably insulated from the bracket and from one another by fiber washers 44. The opposite ends of the stationary switch elements are tied together by a small strip 45 of fiber or other insulative material to which each of said ends is secured by a bolt 46. These bolts 46 also serve to provide terminals whereby wire conductors 47 and 48 may be connected with the stationary switch elements.

Since both bolts 46 are apt to be taken out during attachment of the flasher switch 23 to a bicycle, the strip 45 is permanently secured to the switch element 27 by a rivet 50.

Attention is directed to the fact that the spaces 51 between adjacent ends of the stationary switch elements are relatively narrow, so that the contact point 30 will slide smoothly from one to the other as it moves around its orbit.

The positive side of the current source for each light circuit is connected, through the off-on switch 18 (usually mounted on the battery case), with one side of each of the lights, the other side of each light being connected to ground (i. e. the frame of the bicycle) through the conductor 47 and the flasher switch 23; and since the negative side of the current source is grounded to the bicycle frame, through the case 15, the action of the flasher switch alternately closes and opens the "ground" side of the light circuits.

Mounting the stationary contact member 23 on the bicycle is accomplished without removing the wheel from the frame or disturbing its adjustment, and merely requires loosening one of the nuts 13 on the rear axle. The stationary contact member is prepared for attachment to the bicycle by removing the bolt 46 which holds the half ring 27 assembled to the fiber strip 45 so that the stationary contact ring may be opened as shown in dot-dash lines in Figure 2. While thus opened, the contact ring can be slipped around the axle of the bicycle between the frame and the wheel. Thereafter, the contact ring is closed and the bolt 46 re-inserted as before. The contact member is then secured to the bicycle frame by clamping the bifurcated leg 39 between the nut 13 and the frame with the axle passing through the slot 42. Engagement of the axle with the bottom of the slot 42 automatically disposes the stationary contact ring in a position concentric to the axle. The movable contactor is, of course, readily clamped to a spoke, in position to sweep across the inner faces of the contacts on the contact ring.

From the foregoing description, taken together with the accompanying drawing, it will be readily apparent that this invention provides advantageous lighting equipment for bicycles or other wheeled vehicles wherein a pair of lights will be alternately and recurrently flashed, one of said lights being always illuminated even when the vehicle is stopped. It will also be seen that the flasher switch of this invention is unusually simple and rugged, is extremely easy to install, is self-cleaning, and requires virtually no mechanical energy for its operation, so that it imposes no noticeable drag upon the bicycle.

What I claim as my invention is:

1. Fixed contact means for a bicycle light flasher of the character described, comprising: a bracket having a flat, bifurcated leg adapted to straddle an axle of a bicycle, with the axle received in the slot defined by the bifurcations, and to be clamped between a part of the fork member supporting said axle and another part fixed on the axle, and another leg extending from said bifurcated leg and bent laterally to one side of the plane of the latter; and a pair of flat substantially arcuate contacts secured to said other leg and insulated therefrom and from one another, with their flat faces disposed in a plane substantially parallel to the plane of the bifurcated leg and concentric to an axis transverse to said plane and passing through the slot defined by the bifurcations.

2. The contact means of claim 1, further characterized by the fact that one of the arcuate contacts is pivotally connected at one of its ends with said other leg of the bracket, so as to enable said contact to be swung edgewise away from the other contact, thus permitting the contact means to be installed upon a bicycle, without necessitating removal of a wheel axle from its fork, by straddling the axle with the swung-apart contacts; and further characterized by securement means at the other end of said one contact and at the adjacent end of the other contact for readily detachably holding said first designated contact against such swinging motion.

RAYMOND C. CALLAN.

References Cited in the file of this patent

UNITED STATES PATENTS

| Number | Name | Date |
|---|---|---|
| 1,802,684 | Webbs | Apr. 28, 1931 |
| 1,928,873 | Acton | Oct. 3, 1933 |
| 2,222,075 | Johnston | Nov. 19, 1940 |
| 2,222,765 | Geyer | Nov. 26, 1940 |
| 2,271,664 | Sarchino | Feb. 3, 1942 |
| 2,283,442 | James | May 19, 1942 |
| 2,301,250 | Callan | Mar. 10, 1942 |